United States Patent [19]

Sato et al.

[11] Patent Number: 5,861,915

[45] Date of Patent: Jan. 19, 1999

[54] TEMPERATURE-DEPENDANT, FREQUENCY-COMPENSATED HAND DEVIATION CORRECTION DEVICE FOR VIDEO CAMERA

[75] Inventors: Koichi Sato; Jun Nagai, both of Tokyo, Japan

[73] Assignee: Sony Corporation, Tokyo, Japan

[21] Appl. No.: 651,988

[22] Filed: May 21, 1996

[30] Foreign Application Priority Data

May 31, 1995 [JP] Japan .................................. 7-134125

[51] Int. Cl.⁶ .................................................. H04N 5/228
[52] U.S. Cl. ............................................. 348/208; 396/55
[58] Field of Search ............................. 348/208; 396/52, 396/53, 55; H04N 5/232

[56] References Cited

U.S. PATENT DOCUMENTS

| | | | |
|---|---|---|---|
| 5,502,484 | 3/1996 | Okada ..................................... | 348/208 |
| 5,526,045 | 6/1996 | Oshima et al. .......................... | 348/208 |
| 5,623,305 | 4/1997 | Ishizuka et al. ........................ | 348/208 |
| 5,679,946 | 10/1997 | Mukai et al. .......................... | 250/201.2 |

FOREIGN PATENT DOCUMENTS 9006292 10/1990 Germany .
9111714 1/1992 Germany .

OTHER PUBLICATIONS

Japanese 4-339737, Published Apr. 14, 1993, vol. 17, No. 191—Abstract.

*Primary Examiner*—Wendy Garber
*Assistant Examiner*—Jacqueline Wilson
*Attorney, Agent, or Firm*—Jay H. Maioli

[57] ABSTRACT

A hand deviation correction apparatus of a simplified construction for correcting hand deviation effects over a wide frequency range in a hand-held video camera unit includes an oscillation quantity detection unit for detecting an oscillation quantity of a picture caused by wobbling of the video camera unit, a characteristics compensation unit for variably setting compensating frequency characteristics of an output signal of the oscillation quantity detection unit, a correction unit for correcting oscillations in the picture based upon an output signal of the characteristics compensation unit, a temperature detection unit for detecting the ambient temperature of the correction unit, and a compensation quantity calculating unit for calculating a quantity of compensation to be provided by the characteristics compensation unit based upon a detection signal from the temperature detection unit.

11 Claims, 5 Drawing Sheets

FREQUENCY CHARACTERISTICS
OF ADAPTIVE TEMPERATURE
COMPENSATOR (PHASE)

FREQUENCY CHARACTERISTICS
OF ADAPTIVE TEMPERATURE
COMPENSATOR (GAIN)

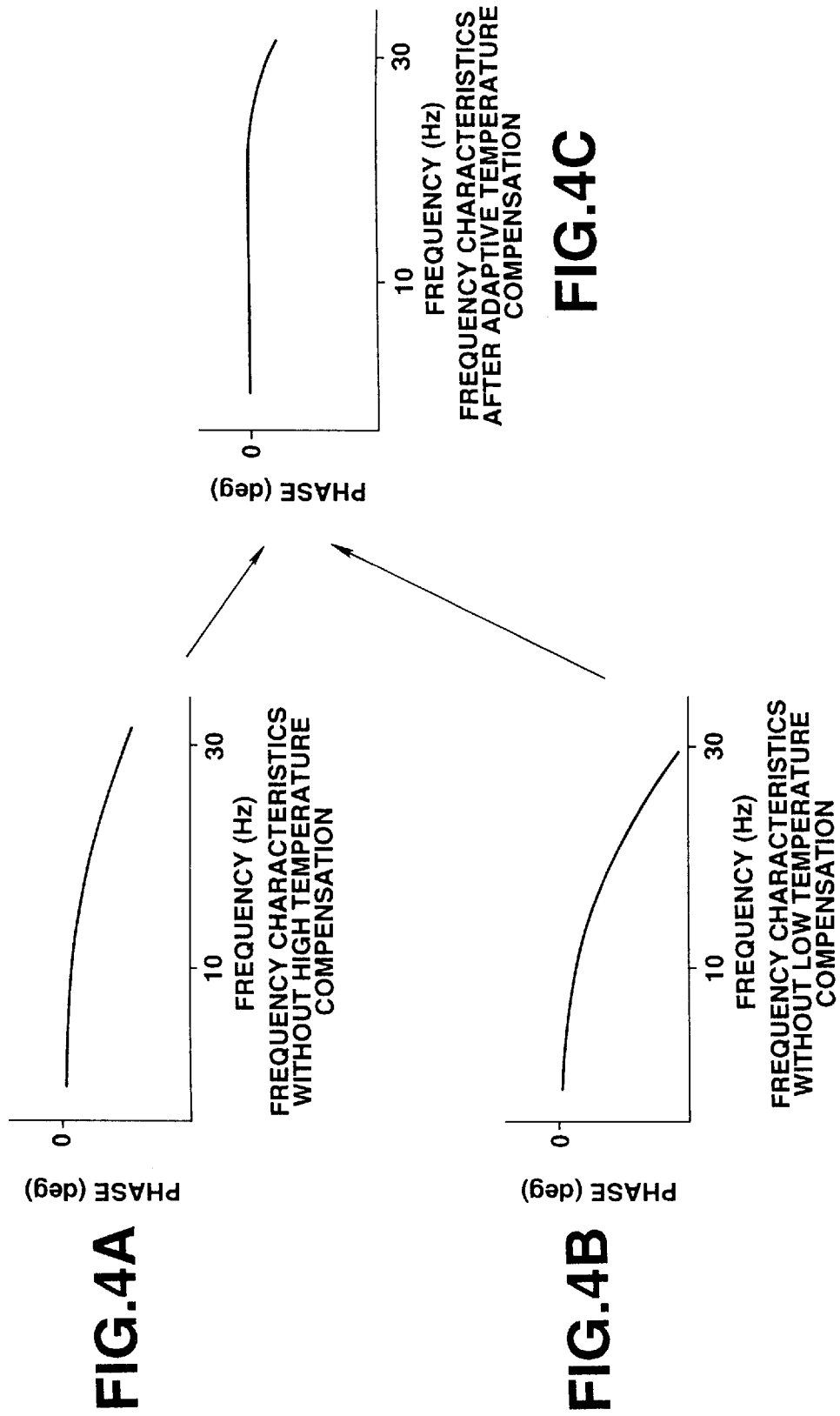

TEMPERATURE-DEPENDANT, FREQUENCY-COMPENSATED HAND DEVIATION CORRECTION DEVICE FOR VIDEO CAMERA

BACKGROUND OF THE INVENTION

1. Field of the Invention

This invention relates generally to an apparatus and method employed with advantage in a handy type video camera apparatus and, more specifically, to a vibration compensation system for such a camera.

2. Description of Background

At present, hand held or so-called handy type video cameras having a CCD image sensor are in widespread use. The handy type video camera apparatus is small-sized and lightweight. For this very reason, however, it has a drawback that it is susceptible to hand deviation or hand wobbling during photographing. If such hand wobbling occurs, "fine wobbling" or oscillations are produced in the picture obtained on reproduction in the case of a picture photographed with, for example, zoom-up. The result of this is that the reproduced picture becomes blurred and difficult to view.

As a means for compensating such oscillations in order to render the reproduced picture easy to view, there is known a technique of compensating hand deviation by using a correction device provided in the video camera apparatus. Among the techniques for correcting hand deviation in the correction device, there is a correction means for correcting the hand deviation by picture processing and a correction means for correcting the hand deviation by optical processing. Among the correction means for correcting hand deviation by picture processing, there are a memory control system and a CCD driving control system.

The memory control system is a system in which, if hand deviation is detected, part of the picture signal obtained upon photographing an object is taken out as a picture frame, and a picture frame of the previous field and the picture frame of the current field are moved into registration with each other. The picture in the picture field portion can be enlarged for improving the range of correction, however, if this picture is enlarged, the reproduced picture is deteriorated in quality because the picture signals are enlarged to more than the resolution of the CCD image sensor. Such deterioration in picture quality becomes all the more conspicuous as the range of correction is widened. Thus, with this previously proposed system the picture quality is lowered, while the range of correction cannot be adequately widened. Nevertheless, the correction means according to this system is constructed using only ICs and, hence, is well suited for use with a small-sized inexpensive video camera apparatus.

With the above-mentioned CCD driving control system, correction is realized by varying the timing of the reading out of the picture signals obtained upon photographing an object from the CCD image sensor when hand deviation is detected. With this system, since the range of compensation is obtained by increasing the number of pixels of the CCD image sensor, it is necessary to increase the number of pixels if hand deviation correction is to be performed, even in those cases where "oscillations" appeared to be enlarged, as in the case of the object photographed with a high magnification ratio described above. If the number of pixels is increased for assuring sufficient correction of hand deviation caused by magnified "oscillations", however, the CCD image sensor and its peripheral circuit become bulky and impractical. With the correction means employing this system, a sufficient number of pixels to correct the hand deviation caused by the magnified "oscillations" is not always assured, so that an image in the reproduced picture corresponding to the hand deviation responsible for such magnified oscillations becomes discrete. The hand deviation correction according to this system can be achieved, however, without any inconvenience with the usual photographic multiplication ratio. Nevertheless, the system is also made up only of ICs and, hence, is suited for use with a small-sized inexpensive video camera apparatus.

Among correction means for correcting hand deviation by optical processing, there have been proposed a gimbal camera system and an active camera system.

The gimbal camera system is a system in which, if hand deviation is detected, the lens unit in its entirety is moved in a direction of canceling the hand deviation, thereby correcting for the hand deviation. With this system, resolution is not deteriorated, and the range of correction may be broader than the above-described electronic techniques. Since the lens unit is moved in its entirety, however, the mechanism becomes bulky and power consumption is increased. Consequently, the correction means employing this system is suited to the case in which it is desired to achieve high resolution at the cost of size and power consumption.

The active prism system is a system in which, when performing correction of hand deviation, only a part of the lens unit is moved in the direction of canceling the hand deviation. With this system, power consumption is small and the device may be easily reduced in size, while resolution is not deteriorated and the range of compensation may be broader. If the hand deviation is compensated using the above-described active prism system, there are produced no "oscillations" in the reproduced picture, so that a handy type video camera apparatus may be achieved which is small-sized and lightweight and which is capable of achieving high picture quality.

The active prism employed in the active prism system described above is produced by interconnecting two glass plates with an expandable bellows formed by a special film and by charging the interior space formed thereby with a liquid having substantially the same optical refractive index as that of the glass plates. The active prism is arranged intermediate between the objective lens provided on the front side of the video camera unit for conducting the image from an object to the video camera unit and the CCD image sensor. The active prism is part of the lens unit for conducting the image of the object to the CCD image sensor from the objective lens. The hand deviation is corrected by varying the angles of inclination, referred to herein as apex angles, of the two glass plates in respective different longitudinal and transverse directions of the video camera unit.

These above-described correction means perform correction of hand deviation based upon detecting an amount of hand deviation and among such previously proposed deviation amount detection means, there are a motion vector detection system and an angular velocity detection system.

The motion vector detection system detects the amount and the direction of the object movement by deriving the difference between the picture signal of the current field and the picture signal of the previous field, which has been stored in a semiconductor memory. This system has the drawback that mistaken operations tend to be produced during a time of low-level illumination. The oscillation amount detection means employing this system, however, is made up using only ICs and, hence, is well suited to a small-sized inexpensive video camera apparatus.

The hand deviation correction device, employed in the above-described handy type video camera apparatus, includes an oscillation amount detection unit for detecting hand deviation of a picture caused by oscillations of the video camera unit using a motion vector detection system or an angular velocity detection system, a correction signal generator for generating a correction signal based upon an output signal of the oscillation amount detection system, and a correction system for correcting hand deviation based upon a correction signal generated by the correction signal generator by a picture processing method employing, for example, a memory control system or a CCD driving control system, or by an optical processing method employing, for example, a mechanical gimbal system or an active prism system.

Meanwhile, the angle of the video camera apparatus is changed not only by hand deviation but also due to the actual, active camera work, for example, by panning, which is a technique of horizontally moving the camera during photographing, or by tilting, which is a technique of vertically moving the camera during photographing.

Active camera work includes, in general, slow camera work and quick camera work. In addition, the camera movement velocity is changed most significantly at the initial and terminal phases of the camera work, so that frequency components from 0.5 Hz to 15 Hz are produced a result of the camera work. This range of frequencies of the camera work differs from user to user.

On the other hand, the frequency components of hand deviation in the case where the user shoots a still object without performing any camera work are 5 to 15 Hz. If the user shoots from a moving object, for example, from a moving car, the main frequency components of the hand deviation are shifted to 15 to 20 Hz, that is, toward the high-frequency side. Also, the frequency range of the hand deviation is different from person to person.

With the above-described hand deviation correction device, hand deviation is corrected by servo control for canceling picture oscillations caused by hand deviation without correcting oscillations by the camera work in the frequency range of 2 to 30 Hz, in order to take into account the hand deviation produced when the user performs the above-mentioned camera work from a moving object. Thus, the reproduced picture by the video camera apparatus is easy to view since the "oscillations" due to hand deviation are not produced.

Meanwhile, in a feedback servo loop system of a servo control circuit performing the above-described servo control, a low-pass filter is provided for prohibiting natural frequency oscillations of the feedback system due to loop disturbances.

The natural frequency of the feedback loop system in the active prism system, for example, is raised in peak gain at elevated temperature conditions and hence is shifted toward the low-frequency side. Thus, the cut-off frequency of the low-pass filter is pre-set to the low-frequency side for prohibiting oscillations at elevated temperatures.

Under conditions other than high temperatures, the natural frequency of the feedback system is restored to the higher frequency, with a decrease in temperature due to lowered peak gain. The cut-off frequency of the low-pass filter, however, is pre-set to a lower frequency. Thus, a problem is presented that the high-frequency region of the feedback loop system is cut off, such that sufficient hand deviation correction cannot be achieved.

As one previously proposed system for overcoming the above problem, there is a method in which one of the plural feedback loops having different natural frequencies is selected depending upon the temperature of the video camera unit for variably setting the natural frequency of the feedback loop systems in order to correct hand deviation, despite changes in temperature of the video camera unit so that oscillations at the natural frequency will be avoided at all times.

The hand deviation correction device, designed for carrying out the above method has a drawback in that the construction becomes complex due to the provision of plural feedback loop systems. This method also has another drawback in that limitations are imposed by the feedback loop such that it becomes difficult to increase the frequency range of the hand deviation correction system.

OBJECTS AND SUMMARY OF THE INVENTION

It is therefore an object of the present invention to provide a hand deviation correction device that is simple in construction and capable of correcting hand deviation over a wide frequency range.

According to one aspect, the present invention provides a hand deviation correction apparatus having an oscillation quantity detection means for detecting an oscillation quantity of a picture brought about by wobbling of a video camera unit, characteristics compensation means for variably setting correcting frequency characteristics of an output signal of the oscillation quantity detection means, a correction means for correcting oscillations in the picture based upon an output signal of the characteristics compensation means, a temperature detection means for detecting the ambient temperature of the correction unit, and a compensation quantity calculating means for calculating a quantity of compensation by the characteristics compensation means based upon a detection signal from the temperature detection means.

In another aspect, the present invention provides a hand deviation correction method including the steps of detecting an oscillation quantity of a picture brought about by the wobbling of a video camera unit, variably setting compensating frequency characteristics of an output signal of the oscillation quantity detection step, correcting oscillations in the picture based upon an output signal of the characteristics compensation step, detecting the ambient temperature of the correction step, and calculating a quantity of compensation by the characteristics compensation step based upon a detection signal of the temperature detection step.

The hand deviation correction device of the present invention variably sets the quantity of compensation of the characteristics compensation means responsive to the results of calculation by the characteristics calculation means based upon a detection signal of the temperature detection means for variably setting frequency characteristics of the characteristics compensation means.

By optimizing the frequency characteristics of the compensation unit responsive to the detection signal of the temperature detection means, the frequency characteristics of hand deviation may be continually optimized over a wide frequency range irrespective of the ambient temperature of the video camera unit for enabling sufficient hand deviation correction by the correction means, despite the simplified construction of the hand deviation correction device.

BRIEF DESCRIPTION OF THE DRAWINGS

FIGS. 3A and 3B show frequency characteristics of the characteristics compensation portion, wherein FIG. 3A shows phase/frequency characteristics and FIG. 3B shows gain/frequency characteristics;

FIGS. 4A to 4C show frequency characteristics of the phase of the response characteristic of an active prism, wherein FIG. 4A shows frequency characteristics in which the ambient temperature of the video camera unit is high and the compensation amount is not as yet optimized, FIG. 4B shows frequency characteristics in which the ambient temperature of the video camera unit is low and the compensation amount is not as yet optimized, and FIG. 4C shows frequency characteristics after optimization of the amount of compensation from the low ambient temperature to the high ambient temperature;

DETAILED DESCRIPTION OF PREFERRED EMBODIMENTS

Figure 1:
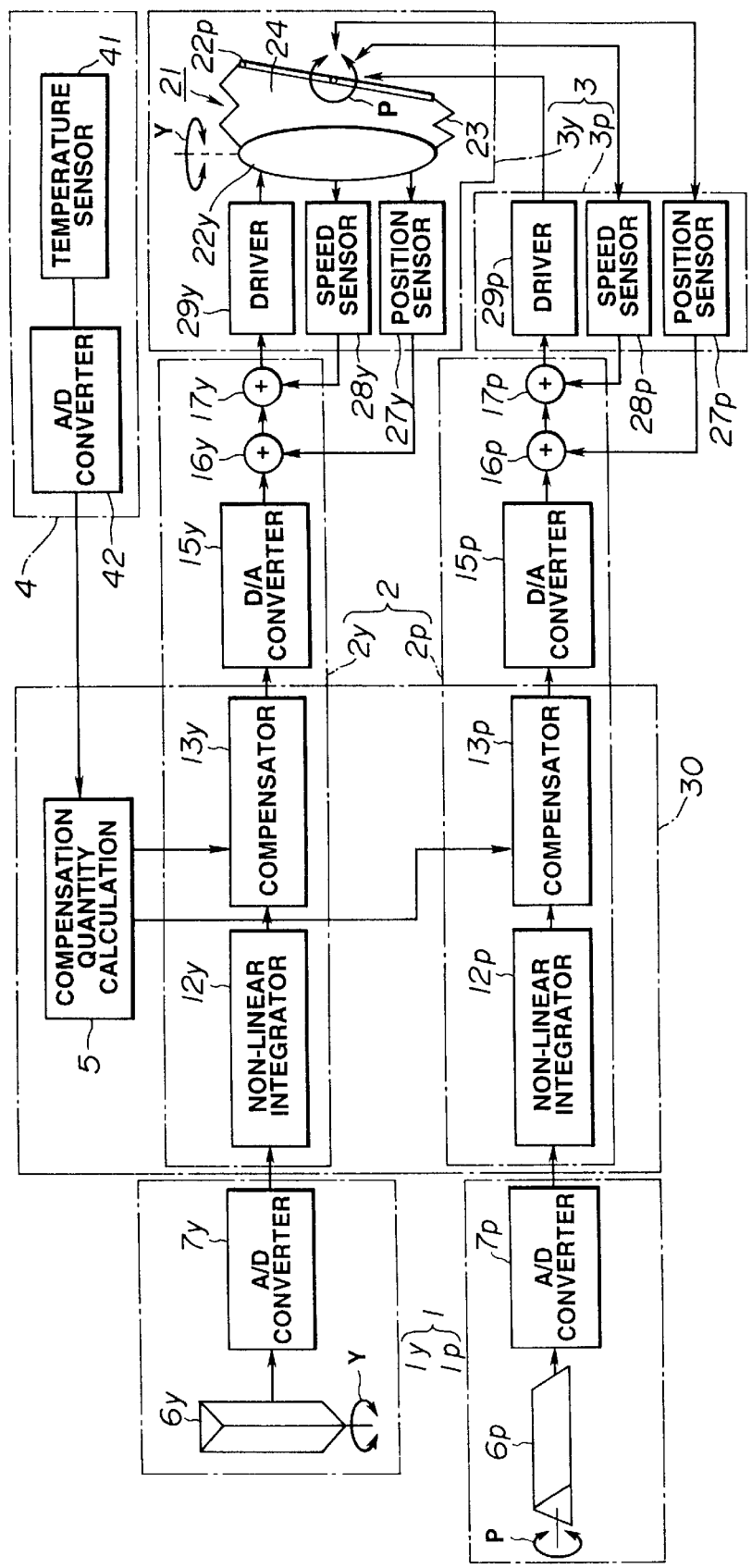
FIG. 1 is a block diagram showing an arrangement of a hand deviation correction device according to an embodiment of the present invention.

Referring to FIG. 1, an embodiment of the hand deviation correction device according to the present invention will be explained in detail. The hand deviation correction device of the present invention is provided for correcting hand deviation of, for example, a handy type video camera apparatus. The hand deviation correction device shown in FIG. 1 employs angular velocity detection in the oscillation amount detection method and employs an active prism system as the correction device.

The hand deviation correction device shown in FIG. 1 includes an oscillation amount detection unit 1, and a correction signal generating unit 2 for generating a correction signal based upon the detection signal from the oscillation amount detection unit 1. The hand deviation correction device also includes a correction unit 3 for correcting the oscillations of the picture based upon the correction signal and a temperature detection unit 4 for detecting the ambient temperature. The hand deviation correction device further includes a compensation amount calculation unit 5 for detecting the detection signal of the temperature detection unit 4.

The oscillation amount detection unit 1 employs an angular velocity detection system comprised of, for example, a piezo-electric oscillating gyro and is made up of oscillation amount detection circuits 1y and 1p provided with detection surfaces thereof directed in the longitudinal and transverse directions of the video camera unit, respectively, for detecting the angular velocity in the y-direction or yaw direction and for detecting the angular velocity in the p-direction or pitch direction, respectively.

The oscillation amount detection units 1y, 1p, respectively, include angular velocity sensors 6y, 6p for the yaw direction and for the pitch direction, filters 8y, 8p for cutting high-frequency components of output signals of the angular velocity sensors 6y, 6p, respectively, and A/D converters 7y, 7p for sampling output signals of the filters 8y, 8p using a sampling frequency sufficiently higher than the pass-band frequency of the correction signal generating unit 2 and for analog-to-digital converting the sampled signals.

The angular velocity sensors 6y, 6p for the yaw and pitch directions are arranged in proximity to an active prism 21 of the correction portion 3 for detecting the angular velocity of the video camera unit in the yaw direction and in the pitch direction, respectively.

The oscillation amount detection portion 1 having the above construction detects the values of the angular velocity caused by oscillations in the yaw and pitch directions of the video camera unit using the angular velocity sensors 6y, 6p, and analog-to-digital converts the detection signals using the A/D converters 7y, 7p in terms of the sampling frequencies to transmit the digitally converted output to the correction signal generation unit 2.

The correction signal generating unit 2 includes non-linear integrators 12y, 12p for generating angular signals based upon the digital oscillation amount in the yaw and pitch directions supplied from the oscillation amount detection circuits 1y, 1p, respectively, and for transmitting the produced angular signals, and compensators 13y, 13p for compensating output signals of the non-linear integrators 12y, 12p, respectively. The correction signal generating unit 2 also includes digital-to-analog (D/A) converters 15y, 15p for converting digital output signals of the compensators 13y, 13p to produce analog angular signals, and two pairs of mixing circuits 16y, 17y and 16p, 17p supplied with the analog angular signals from the D/A converters 15y, 15p, respectively.

The non-linear integrators 12y, 12p integrate the sums of products of the digital angular signals supplied from the A/D converters 7y, 7p of the oscillation amount detection unit 1 over the sampling time of the angular velocity signals to find an angle derived from the oscillations in the yaw and pitch directions of the video camera unit in order to transmit angular signals derived from the detected angle to the compensators 13y, 13p. One embodiment of such a non-linear integrator is shown in FIG. 6.

Figure 6:
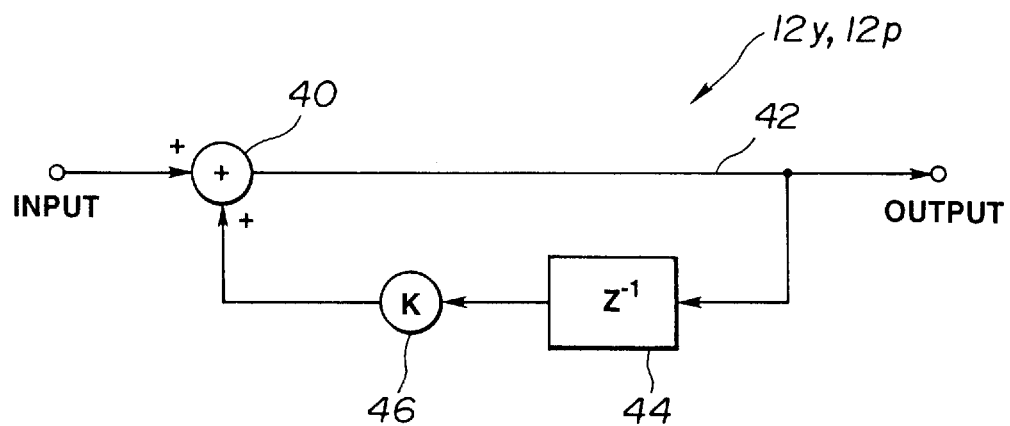
FIG. 6 shows an embodiment of the non-linear integrator used in the device of FIG. 1.

The circuit of FIG. 6 is an example of a non-linear integrator such as 12y or 12p of FIG. 1. The digital signal, such as from A/D convertor 7y or 7p, is fed to one input of an adder 40 whose output on line 42 becomes the output of the integrator fed to one of the compensators 13y or 13p, for example. That output line 42 is fed to a time delay unit 44 that imparts a time delay corresponding to a sampling interval of the digital system. This is a well-known technique used in digital filtering and the time delay unit corresponds to $(1/f_s)$, where $f_s$ is the sampling frequency of the digital system. The delayed signal is then fed to a signal multiplier or scaler 46 that applies a coefficient K to its input signal. This circuit construction described so far is generally known and usually the coefficient K is a constant value.

Figure 7:
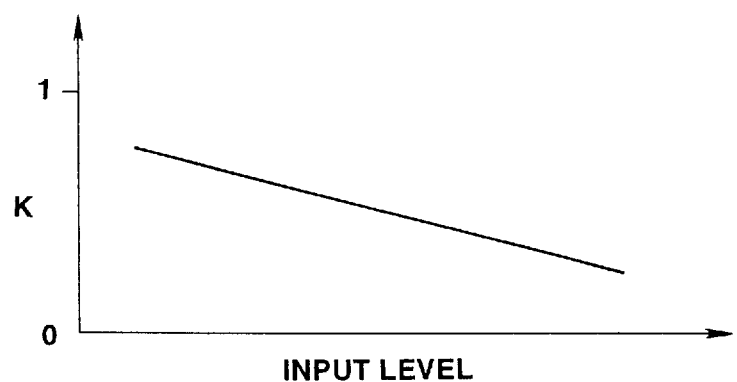
FIG. 7 is a graph showing coefficient values employed in the circuit of FIG. 6.

In the embodiment of FIG. 1, however, the integrators 12y, 12p are non-linear integrators, so that in the circuit of FIG. 6 the coefficient K will not be a constant value. The non-linearity of the non-linear integrators 12y, 12p results from the characteristic of the coefficient K, which is dependent upon the input level fed to it. More specifically, the value of the coefficient K decreases as the input level fed to it increases. Such a response characteristic is shown in FIG. 7, where it is seen that the value of the coefficient K decreases as the input level increases. Decreasing the value of coefficient K results in decreasing the amount of integrated data that is output from the non-linear integrators 12y, 12p. The output of the multiplier 46 is fed to a second positive input of adder 40 to thereby form the output signal on line 42.

The non-linearity characteristic of the integrators 12y, 12p effectively prevents the output level of the non-linear integrators from exceeding the limit of dynamic range of the digital filtering, which is defined by an effective number of bits of data processed by the microprocessor (not shown) used to embody the system of FIG. 1, as well as the non-linear integrator of FIG. 6.

Turning back to FIG. 2, the compensator 13y includes a multiplier 31y for multiplying the output signal of the non-linear integrator 12y with a compensation value K1, and a delay circuit 32y for delaying the resulting product of the multiplier 31y. The compensator $13_y$ also includes a multiplier $33_y$ for multiplying an output signal of the delay circuit 32y with a compensation value K2 and a subtractor 34y for subtracting an output signal of the multiplier $33_y$ from an output signal of the multiplier 31y. The compensator $13_y$ also includes an adder 35y for summing an output signal of the subtractor 34y to an output signal of a multiplier 36 and transmitting the resulting sum to the D/A converter 15y, and a delay circuit 37y for delaying the resulting product of the multiplier 35y. The multiplier 36y multiplies an output signal of the delay circuit 37y with a compensation value K3 to produce the signal fed to the adder 35y. The time delay units are represented by $Z^{-1}$ which as described above is based on the digital sampling frequency $f_s$ and is defined as $(1/f_s)$. This sampling interval depends on the processing speed of the microprocessor that is provided in this system.

The compensator $13_y$ has a transfer function $\theta_0$ represented by the following equation:

$$\theta_0 = K_1 * \frac{1 - K_2 * Z^{-1}}{1 - K_3 * Z^{-1}}$$

wherein the operator $Z^{-1}$ represents the time delays imparted by the circuit 32y and the delay circuit 37y and $K_1$, $K_2$, and $K_3$ are the compensation values.

In the compensator 13y, the compensation values $K_1$, $K_2$, $K_3$ are calculated by the compensation quantity calculation unit 5 based upon a detection signal of the temperature detection unit 4 and are variably set. If these compensation values $K_1$, $K_2$, and K3 are varied, the frequency characteristics of the transfer function $\theta_0$ are varied, as is apparent from equation (1) above, wherein $1-K_2*^{Z-1}$ and $1-K_3*^{Z-1}$ are a lead compensation element and a lag compensation element, respectively.

The control of the compensators 13y, 13p by the compensation quantity calculation unit 5 is based on the selection of the coefficients $K_1$, $K_2$, and $K_3$ corresponding to the detected ambient temperature. The present invention contemplates that the compensation quantity calculation unit 5 can be embodied by a microprocessor using a look-up table in which values of $K_1$, $K_2$, and $K_3$ corresponding to the detected ambient temperature are stored. In this embodiment, the compensation quantity calculation unit 5 causes the values of coefficients $K_2$ and $K_3$ to increase in proportion as the detected ambient temperature decreases. Then, coefficient $K_1$ is calculated by the equation $(1-K_3)/(1-K_2)$.

As described above, this operation can be advantageously performed by a microprocessor using a look-up table in which coefficient values are stored for addressing by the detected ambient temperature. In this way the frequency versus gain and phase characteristics of the adaptive temperature compensator are varied, so amounts of gain and phase compensation increase in accordance with a decrease in the detected ambient temperature.

Figure 3A:
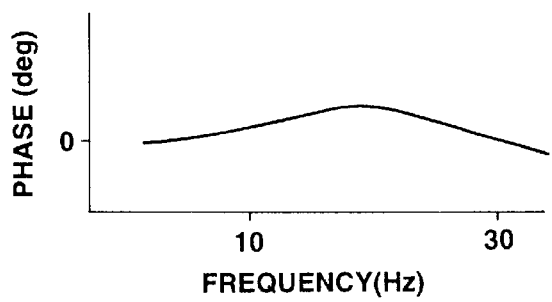
Figure 3B:
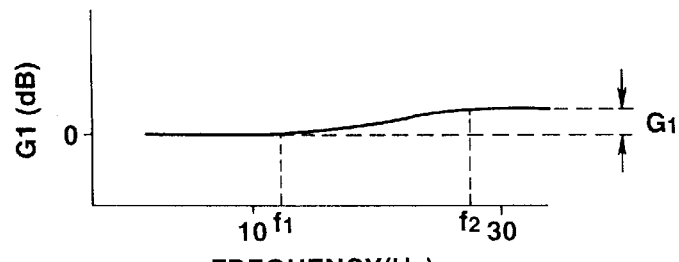

Thus it becomes possible to variably set and optimize phase frequency characteristics, that is, the phase of the compensator $13_y$ as shown in FIG. 3A and gain/frequency characteristics, that is, gain $G_1$, as to the cut-off points $f_1$, $f_2$ of the compensator $13_y$ as shown in FIG. 3B.

If the ambient temperature of the video camera unit is 70° C., the non-optimized active prism has phase versus frequency response characteristics as shown in FIG. 4A and if the ambient temperature of the video camera unit is –10° C., the active prism has phase versus frequency response characteristics as shown in FIG. 4B, the phase versus frequency response characteristics may be rendered substantially constant in the frequency range of 2 to 30 Hz, without regard to the ambient temperature of the video camera unit, by optimizing the compensation values $K_1$, $K_2$, and $K_3$ responsive to detection signals by the temperature detection unit 4, for each detection signal in the temperature range from –10° C. to 70° C., as shown in FIG. 4C.

The same holds true for the gain $G_1$ of the compensator 13y. That is, the gain versus frequency response characteristics may be rendered substantially constant in the frequency range of 2 to 30 Hz, without regard to the ambient temperature of the video camera unit, by optimizing the compensation values $K_1$, $K_2$, and $K_3$ responsive to detection signals by the temperature detection unit 4 for each detection signal. That is, the compensator $13_y$ functions as characteristics compensation means for compensating frequency characteristics of the output signal of the yaw oscillation quantity detection unit 1y.

The compensator 13p is configured similarly to the compensator $13_y$ and functions as characteristics compensation means for compensating frequency response characteristics of the output signal of the pitch oscillation quantity detection unit 1p.

The D/A converters 15y, 15p convert the digital angular signal supplied from the compensators 13y, 13p and transmit the resulting analog signals to the mixing circuits 16y, 16p, respectively.

The mixing circuits 16y, 16p mix the output signals of the D/A converters 15y, 15p with the apex angle signals supplied from the correction unit 3 and transmit the resulting mixed signals to the mixing circuits 17y, 17p, respectively.

The mixing circuits 17y, 17p mix the mixed signals from the mixing circuits 16y, 16p with the apex angular velocity signals supplied from the correction unit 3 to generate the correction signals that are supplied to the correction unit 3.

The correction signal generating unit 2, described above, operates as follows: the digitized angular velocity signals in the yaw and pitch directions, supplied from the oscillation amount detection circuits 1y, 1p, are converted by the non-linear integrators 12y, 12p into angular signals, which are frequency-response-compensated in response to the ambient temperature by the compensators 13y, 13p and converted by the D/A converters 15y, 15p into analog angular velocity signals. These analog angular velocity signals are then mixed in the mixing circuits 16y, 16p with the apex angle position signals supplied from the correction unit 3 to produce mixed signals. These mixed signals are mixed with the apex angular velocity signals also supplied from the correction unit 3 to generate correction signals in the yaw and pitch directions, which correction signals are transmitted to the correction unit 3.

The correction unit 3, constructed in accordance with the active prism system of the present invention, includes the active prism 21 arranged on the front side of a CCD image sensor, not shown, that receives an image of an object, position sensors 27y, 27p for detecting apex angles of the active prism 21 in the yaw and pitch directions, speed sensors 28y, 28p for sensing the speed of variation of the apex angle, and driving units 29y, 29p for variably driving the apex angles of the active prism 21.

The active prism 21 includes glass plates 22y, 22p rotatable in the yaw and pitch directions, a bellows 23 formed of a special film for expandably and retractably interconnecting the glass plates 22y, 22p, and a liquid 24 of substantially the same optical refractive index as that of the glass plates 22y, 22p. The liquid 24 is injected into the interior space formed between the glass plates 22y, 22p, which are interconnected by the bellows 23.

By varying the apex angles of the glass plates 22y, 22p of the active prism 21 in appropriate directions by the drivers 29y, 29p for canceling hand deviation, the image of an object formed on the CCD image sensor via the active prism 21 is freed of the deleterious effects of the hand deviation, so that an image that is free of "oscillations" is formed on the CCD image sensor.

The position sensors 27y, 27p are comprised of photosensors located on the sides of the glass plates 22y, 22p of the active prism 21, respectively, for sensing the apex angle positions in the yaw and pitch directions of the glass plates 22y, 22p, respectively.

The speed sensors 28y, 28p can be accelerometers that detect the speed of movement of the apex angle positions detected by the position sensors 27y, 27p for detecting the speed of variation of the apex angles of the glass plates 22y, 22p of the active prism 21.

The driver unit 29y includes an inverting circuit, not shown, for inverting the correction signal supplied from the mixing circuit 17y and a driving circuit for displacing and driving the glass plate 22y of the active prism 21 in the yaw direction based upon the inverted correction signal.

The driver unit 29y drives the apex angle of the glass plate 22y of the active prism 21 by the driving circuit contained in the driver unit 29y, based upon the correction signal supplied from the mixing circuit 17y, in a direction for canceling the hand deviation.

The correction unit 3, as described above, is fed with correction signals from the correction signal generating unit 2 through the mixing circuits 16y, 16p and mixing circuits 17y, 17p. The driver units 29y, 29p thus fed with the correction signals operate for varying the apex angles of the glass plates 22y, 22p, based upon the correction signals, in directions for canceling the hand deviation.

The positions and the varying speeds of the apex angles of the glass plates 22y, 22p of the active prism 21 are detected by the position sensors 27y, 27p and the speed sensors 28y, 28p of the correction unit 3, respectively, and thence transmitted to the mixing circuits 16y, 17y and mixing circuits 16p, 17p of the correction signal generating unit 2, respectively.

The temperature detection unit 4 includes a temperature sensor 41 for detecting the ambient temperature of the video camera unit and an A/D converter 42 for converting to a digital signal the analog output signal of the temperature sensor 41 and transmitting the converted digital output to the compensation quantity calculating unit 5.

Figure 5:
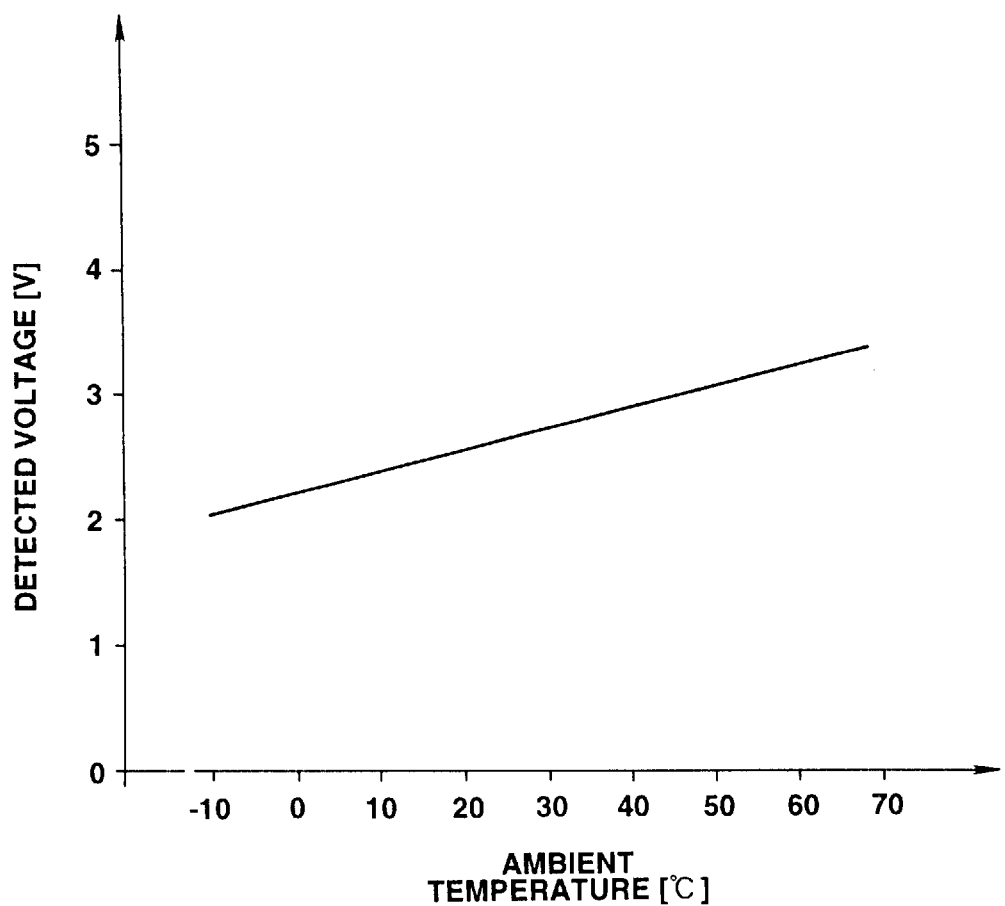
FIG. 5 shows characteristics of a detection signal of a temperature detection unit of the hand deviation correction device with respect to the ambient temperature of the video camera unit.

The temperature detection unit 4 detects different ambient temperatures of the video camera unit 1 as voltages, converts these voltages to digital values, and transmits the digital detection signal to the compensation quantity calculating unit 5, as shown in FIG. 5. As described above, this digital detection signal can be used to address a look-up table to obtain the compensation coefficient.

Figure 2:
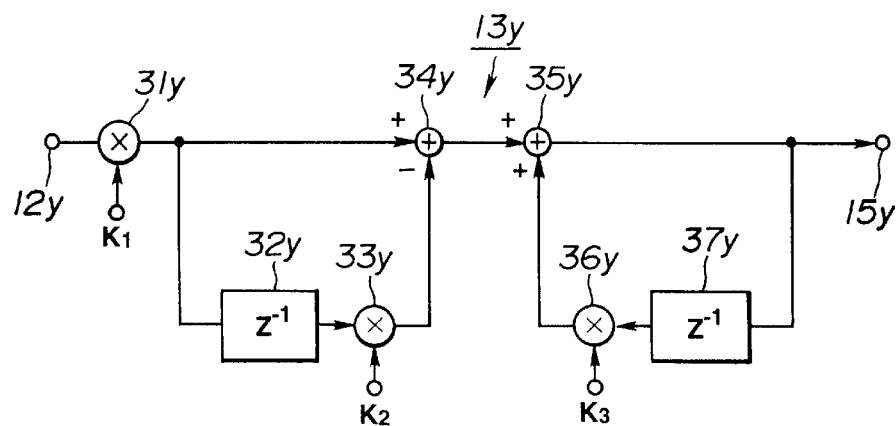
FIG. 2 is a block diagram showing an arrangement of a characteristics compensation portion of the hand deviation correction device shown in FIG. 2.

The compensation quantity calculating unit 5 calculates the compensation values $K_1$, $K_2$, and $K_3$ shown in FIG. 2 based upon the detection signal from the temperature sensor 4, and variably sets the compensation amounts of the compensators 13y, 13p of the correction signal generating unit 2 by these compensation values $K_1$, $K_2$, and $K_3$.

In this embodiment, the compensation quantity calculating unit 5 and the non-linear integrators 12y, 12p and the compensators 13y, 13p of the compensation quantity calculating unit 5 can be constructed by a micro-computer or microprocessor represented by the broken line at 30.

With the above-described hand deviation correction device, the compensation amounts of the compensators 13y, 13p are variably set responsive to the results of calculation of the compensation quantity calculating unit 5 from the detection signal of the temperature detection unit 4 for variably setting frequency characteristics of the compensators 13y, 13p. By this simplified construction, the frequency characteristics of the compensators 13y, 13p may be optimized responsive to the detection signals by the temperature detection unit 4 for continually optimizing the frequency response characteristics of the active prism for achieving sufficient hand deviation correction by the correction unit 3.

The hand deviation correction device according to the instant embodiment employs an angular velocity detection system and an active prism system as the oscillation quantity detection means and as the correction means, respectively. The present invention, however, is not limited to this construction. For example, with the use of the hand deviation correction device according to the present invention, since a small-sized and lightweight handy type video camera apparatus may be realized in which hand deviation is corrected by the correction unit by a picture processing method, such as a memory control method or a CCD driving control method, or by an optical processing method, such as a gimbal mechanical system or an active prism system, upon detection of such hand deviation by a detection method such as a motion vector detection method or the angular velocity detection method, no "oscillations" due to hand deviation or wobbling will be produced in the reproduced picture.

Although the present invention has been described hereinabove with reference to the preferred embodiment, it is to be understood that the invention is not limited to such illustrative embodiment alone, and various modifications may be contrived without departing from the spirit or essential characteristics thereof, which are to be determined solely from the appended claims.

What is claimed is:

1. A hand deviation correction apparatus for a video camera unit comprising:

oscillation quantity detection means for detecting an oscillation quantity caused by wobbling of the video camera unit, wherein said oscillation quantity detection means includes a yaw angular velocity sensor, producing a yaw output signal and a pitch angular velocity sensor producing a pitch output signal;

characteristics compensation means for variably setting compensating frequency characteristics of an oscillation quantity output signal from said oscillation quantity detection means, wherein said characteristics compensation means includes a yaw non-linear integrator receiving said yaw output signal and a pitch non-linear integrator receiving said pitch output signal;

correction means for correcting oscillations in an image detected by the video camera unit based upon an output signal from said characteristics compensation means, wherein said characteristics compensation means further includes a yaw compensator receiving an output signal from said yaw non-linear integrator for producing an output fed to said correction means and a pitch compensator receiving an output signal from said pitch non-linear integrator for producing an output fed to said correction means;

temperature detection means for detecting an ambient temperature of said correction means; and compensation quantity calculating means for controlling said characteristics compensation means for setting a quantity of compensation based upon an ambient temperature detection signal from said temperature detection means, wherein each of said yaw compensator and said Ditch compensator includes a plurality of signal multipliers for multiplying a signal fed thereto by a coefficient from said compensation quantity calculating means.

2. The hand deviation correction apparatus according to claim 1, wherein each of said yaw non-linear integrator and said pitch non-linear integrator comprises a coefficient multiplier having a coefficient that decreases as a level of input signal thereto increases.

3. The hand deviation correction apparatus according to claim 1, wherein said compensation quantity calculating means provides three coefficients to said plurality of multipliers in said yaw compensator and three coefficients to said plurality of multipliers in said pitch compensator and said compensation quantity calculating means sets said coefficients to increase as the ambient temperature detected by said temperature detection means decreases.

4. The hand deviation correction apparatus according to claim 1, wherein said correction means comprises an active prism having first and second glass plates relatively movable one to another.

5. The hand deviation correction apparatus according to claim 1, wherein said characteristics compensation means comprises a yaw compensator receiving an output of said yaw non-linear integrator and a pitch compensator receiving an output of said pitch non-linear integrator.

6. A hand deviation correction method for a video camera unit comprising the steps of:

detecting an oscillation quantity of a picture brought about by wobbling of the video camera unit;

variably setting compensating frequency characteristics of an oscillation quantity output obtained in said step of detecting an oscillation quantity;

correcting oscillations in an image detected by the video camera unit based upon an output obtained in said step of setting the compensation frequency characteristics;

detecting an ambient temperature of the video camera during said step of correcting oscillations; and calculating a quantity of compensation provided by said characteristics compensation step based upon the ambient temperature detected in said step of detecting an ambient temperature, wherein the step of calculating a quantity of compensation includes generating three multiplier coefficients based on the detected ambient temperature, and said step of variably setting compensating frequency characteristics includes performing compensation using a digital filter having three multipliers receiving the three coefficients generated in the step of calculating.

7. The hand deviation correction method according to claim 6, wherein the step of detecting an oscillation quantity includes detecting a yaw direction angular velocity and a pitch direction angular velocity.

8. The hand deviation correction method according to claim 6, wherein said step of correcting oscillations includes varying an axial orientation of an active prism arranged before an image sensor of the video camera unit.

9. Apparatus for correcting deviations caused by hand movements in a video camera, comprising:

detection means for detecting yaw and pitch oscillation movements of the video camera and producing respective yaw and pitch oscillation quantity outputs;

compensator means for variably setting frequency characteristics of the yaw and pitch oscillation quantity outputs in response to compensation control signals fed thereto, wherein said compensator means comprises a yaw non-linear integrator receiving said yaw oscillation quantity output and a pitch non-linear integrator receiving said pitch oscillation quantity output;

a correction signal generator receiving outputs from said compensator means and producing image oscillation correction signals, wherein said compensator means comprises a yaw compensator receiving an output signal from said yaw non-linear integrator for producing an output fed to said correction signal generator and a pitch compensator receiving an output signal from said pitch non-linear integrator for producing an output fed to said correction signal generator;

image oscillation correcting means including an active prism for correcting deviations in an image detected by the video camera in response to said image oscillation correction signals producing by said correction signal generator;

a temperature detector for detecting an ambient temperature of said image oscillation correction means and producing an ambient temperature signal; and compensation quantity calculating means receiving said ambient temperature signal and producing said compensation control signals fed to said compensator means, whereby said frequency characteristics of said compensator means are controlled in response to said detected ambient temperature, wherein each of said yaw compensator and said pitch compensator includes a plurality of signal multipliers for multiplying a signal fed thereto by a coefficient from said compensation quantity calculating means.

10. The apparatus for correcting deviations according to claim 9, wherein each of said yaw non-linear integrator and said pitch non-linear integrator comprises a coefficient multiplier having a coefficient that decreases as a level of input signal thereto increases.

11. The apparatus for correcting deviations according to claim 9, wherein said compensation quantity calculating means provides three coefficients to said plurality of multipliers in said yaw compensator and three coefficients to said plurality of multipliers in said pitch compensator and said compensation quantity calculating means sets said coefficients to increase as the ambient temperature detected by said temperature detection means decreases.

* * * * *